US006470436B1

(12) United States Patent
Croft et al.

(10) Patent No.: US 6,470,436 B1
(45) Date of Patent: Oct. 22, 2002

(54) ELIMINATING MEMORY FRAGMENTATION AND GARBAGE COLLECTION FROM THE PROCESS OF MANAGING DYNAMICALLY ALLOCATED MEMORY

(75) Inventors: Walter E. Croft, San Mateo; Alex Henderson, Hillsborough, both of CA (US)

(73) Assignee: Fast-Chip, Inc., Sunnyvale, CA (US)

( * ) Notice: Subject to any disclaimer, the term of this patent is extended or adjusted under 35 U.S.C. 154(b) by 0 days.

(21) Appl. No.: 09/203,995

(22) Filed: Dec. 1, 1998

(51) Int. Cl.[7] .............................................. G06F 12/00
(52) U.S. Cl. ....................................... 711/206; 711/209
(58) Field of Search ............................... 711/202, 203, 711/206, 207, 209

(56) References Cited

U.S. PATENT DOCUMENTS 4,577,274 A * 3/1986 Ho et al. ..................... 364/200

OTHER PUBLICATIONS

Hennessy, John L. and David A. Patterson. Computer Architecture: A Quantitative Approach. Second Edition. 1996. pp. 439–453.*

* cited by examiner

Primary Examiner—Kevin Verbrugge
(74) Attorney, Agent, or Firm—Fenwick & West LLP (57) ABSTRACT

A hardware or software apparatus, or a combination of both, is used for efficiently managing the dynamic allocation, access and release of memory used in a computational environment. This apparatus reduces, or preferably eliminates, the requirements for application housekeeping, such as garbage collection, by providing substantially more deterministic dynamic memory management operations. Housekeeping, or garbage collection, such as memory compaction and unused space retrieval, are reduced or eliminated. When housekeeping is eliminated, all dynamic memory invocations become substantially deterministic. The invention maps all or a part of a large, sparsely populated logical memory address space used to store dynamically allocated objects, to a smaller, denser physical memory address space. This invention results in a reduction in processing overhead in the computational environment, such as an operating system, which enhances performance, since the application no longer requires housekeeping functions from the environment. This process is particularly applicable to software components developed utilizing object oriented programming, which is more likely to use temporary memory allocation and release, thereby requiring significant housekeeping functions in the prior art.

37 Claims, 11 Drawing Sheets

FIG. 1, Memory Space Mapping 10

FIG. 2, Prior Art System Interconnection 24

FIG. 3, DMM Invention Block Diagram 20

FIG. 4, Management Function Block Diagram 70

FIG. 5, Control Sequencer: Main Loop 80

FIG. 6, Control Sequencer: Process Initialize 120

FIG. 7, Control Sequencer: Process Allocate 140

FIG. 8, Control Sequencer: Process Release 170

FIG. 9, Control Sequencer: Process Diagnostic 200

FIG. 10, Diagram of Address Translation Function 14

FIG. 11, Embodiment of Address Translation Function 14

ELIMINATING MEMORY FRAGMENTATION AND GARBAGE COLLECTION FROM THE PROCESS OF MANAGING DYNAMICALLY ALLOCATED MEMORY

There are no Cross References to Related Applications.

There is no Federally Sponsored R & D related to this application.

There is no Microfiche Appendix related to this application.

BACKGROUND OF THE INVENTION

This invention relates to efficiently managing the dynamic allocation, access, and release of memory used in a computational environment. This memory may be used to store data or commands for a computational unit, such as a computer. This invention particularly applies to memory used in typical computational environments in which high utilization rates impair the performance of the computational unit, largely due to the need for memory management functions such as compaction and garbage collection, on behalf of the applications. More particularly, this invention relates to dynamic memory management, in which memory allocations and releases, as well as housekeeping functions in general, do not have substantially deterministic responses during execution of an application of the computational unit in the prior art.

Historically, memory used in a computational environment, such as a computer, has been expensive and of questionable reliability. The general belief was that this memory should be utilized or "packed" as fully as possible. Methods for the efficient, here used in the sense of fully utilized, use of memory became standard, and have not been seriously questioned before this invention, though attempts have been made to reduce the impact on performance of such usage, and to make the operations more deterministic. Kevin D. Nilsen, U.S. Pat. No. 5,687,368, teaches the conventional view of the methods for efficient memory implementation. The '368 patent addresses a major shortcoming of the prior art, which is loss of computational performance due to the need for memory management, also called housekeeping, to achieve efficient use of memory. The '368 patent teaches the use of a hardware implementation to alleviate the problem of loss of performance in the computational unit. However, the '368 patent does not teach reducing or eliminating housekeeping functions or mapping large, sparsely populated logical memory address space onto smaller, denser physical memory address space as in this invention. The '368 patent also does not teach making housekeeping functions more deterministic in the way or to the extent that the present invention does. The traditional methods of the prior art, even when implemented in a hardware structure like that of the '368 patent, copy data from memory location to memory location in order to compact and "garbage collect" the data. Garbage collection is a term used to describe the processes in a computer which recover previously used memory space when it is no longer in use. Garbage collection also consists of re-organizing memory to reduce the unused spaces created within the stored information when unused memory space is recovered, a condition known as fragmentation. The prior art inherently reduces the performance of the computational unit, due to the need to perform these operations and the time consumed thereby. Further, these operations are inherently not substantially deterministic, since the iterative steps required have no easily determinable limit in the number of iterations. Basic assumptions in the prior art have been that memory should be optimized with respect to the utilization of the memory address space, rather than of the actual memory itself. Reliability was also considered to be a factor in utilizing available memory space as efficiently as possible. As a consequence, the atomic memory management data size was set in small blocks; usually 1024 bytes. Memory management systems (MMS) of the prior art then searched for memory not in use, often down to the individual block, in order that memory space could be freed as expeditiously and to as small a unit size as possible. This process is one of the housekeeping functions, and is commonly referred to as "garbage collection". This process often requires the use of substantially indefinite numbers of iterations, making the loss in performance substantially not deterministic. The small size of the atomic memory unit often causes small pieces of memory, which are being used, to be interspersed with unused, or "garbage" locations, a process known as "fragmentation" of memory. Since this could result in significant problems in accessing streams of data due to the necessity to access small locations which are not contiguous, a technique known as "compaction" or "defragmentation" has been employed. This causes special commands and routines to be required and frequently used. In the UNIX operating system environment, when programming in ANSI C, for example, function calls that directly or indirectly invoke these representative routines by allocating and releasing dynamic memory are known as "malloc( )", "calloc( )", "realloc( )", and "free( )". Again, these functions and the directly or indirectly invoked representative routines require a substantially indefinite number of iterations, and are substantially not deterministic. Additionally, to aid the functions above and to better utilize available memory, various concepts such as "relocatable memory" were developed and implemented, thereby allowing for more efficient routines for memory management functions such as compaction and defragmentation. Memory management functions, using relocatable memory, work by copying memory atomic units (objects) from one location in memory to another, to allow garbage fragments between valid objects to be combined into larger free memory areas. However, while improving the flexibility of the allocation process, relocatable memory also requires indefinite numbers of iterations, and further makes the time required for housekeeping functions substantially not deterministic.

The present invention recognizes the fact that computational systems are becoming larger, and garbage collection is becoming less deterministic, more complex, and requires a substantial amount of computational time to be expended that would otherwise be available for productive work by the computational unit.

SUMMARY OF THE INVENTION

It is an object of this invention to map a large, normally contiguous, section of the logical memory address space used to store dynamically created objects accessed by a computational unit such as a computer to a smaller physical memory address space. The need for housekeeping functions is reduced and may be preferably eliminated. Examples of housekeeping functions hereby reduced or eliminated are garbage collection and memory compaction. It is a further object of this invention to translate or map the addresses of a computational unit such as a computer, which may have a very large and sparsely populated logical memory address space, to the much smaller and denser physical memory address space of a physical memory. The physical memory address space of this invention is preferably of fixed size and statically located. Because housekeeping functions, which reduce system performance, are reduced and can be eliminated, the computational unit performance is thereby improved, and the execution of dynamic memory management processes becomes deterministic.

In accordance with a first embodiment of the present invention, a computational memory consisting of fixed sized modules of physical memory is formed. This is also referred to as "private memory address space" herein. The associated physical memory is interfaced to a CPU and the "logical memory address space" the CPU controls by means of a memory address mapping interface, referred to herein as a Dynamic Memory Manager (DMM).

The logical memory address space in today's microprocessor based systems is defined by the size of the address bus. Large microprocessor systems tend to be 32 bits or 64 bits wide. Note that 32 bits can define a space of nearly 4.3 billion bytes (232) and 64 bits can define a space of nearly 185,000 trillion bytes (264). In contrast, the physical memory connected to the same system substantially ranges in size from 1 million bytes (220) to 1 billion bytes (230). This invention capitalizes on this vast difference in size between the logical memory address space supported by the address bus and the real world physical memory size utilized in most microprocessor systems.

As an example, a current workstation as a microprocessor system may have an address bus of 32 bits. Mapped to this logical memory address space by the CPU are several possible physical memories such as RAM, ROM, and flash plus physical devices such as disk drive controllers, video interfaces, and network interfaces. Each of these memories and devices require unique address space within the logical memory address space, the largest of which is most likely the RAM memory at, say, 128 megabytes (227). All the devices in the microprocessor system can be mapped into much less than half of the 32 bit address bus (231) leaving a high addressed 2.1 billion bytes (232 less the 231 noted above) for use by the DMM. In an example of utilizing this large, contiguous logical memory address space, the DMM partitions it into 32,768 individual elements, each of which is assumed to be 65,536 bytes. The starting address of each element in this example is substantially on a 65,536 byte (216) boundary. If each of the 32,768 elements were allocated at the same size, and the DMM controlled a (227) physical memory, each element would be 4,096 bytes. This is not to imply all elements must be the same size, this is not a requirement, nor is it likely to be found in a system. The purpose is to point out the DMM is constrained to allocate only as much physical memory as it controls.

To continue with the example, the CPU could access memory controlled by the DMM by placing a bus address on the system bus within substantially the range of (232 minus 231 and indicating if the memory access is a read or write operation. Note that most of the potential addresses are invalid and the preferred embodiment of the DMM will cause an invalid memory access trap to be generated when presented with an invalid address. A valid address would be one that the DMM had previously returned to the CPU during an allocation that has not since been released. Accesses past the starting address are valid, as long as the addresses are not greater than the starting address of the allocation plus substantially the length of the dynamic memory object.

In general terms, logical addresses on the memory bus are mapped by the DMM into the physical memory, which is defined by a physical memory address space smaller than the logical memory address space. By this invention, the physical memory address space is made accessible over substantially the range of the large, sparsely populated logical memory address space.

This allows the containment of bad data or fragmented areas without the need for compaction or garbage collection, etc., which are included in the functions commonly known in the art as "housekeeping" functions. For example, the present invention makes the common UNIX and ANSI "C" functions malloc( ), calloc( ), realloc( ), and free( ) faster and more deterministic in their execution time. The CPU "overhead" or performance-degrading operations required by these functions, or other so called "background routines" to perform delayed "housekeeping", is reduced, and preferably eliminated.

In accordance with a second embodiment of the present invention a hardware implementation is incorporated within a CPU, such as inside an integrated circuit chip which includes the CPU and computational memory functions. In addition to the above mentioned invention improvements, performance is increased due to the CPU having on chip access to the DMM and not being required to contend with other system bus transfers to access dynamic memory.

In accordance with a third embodiment of the present invention, software (also called "code") is loaded into the CPU. The code, commonly part of the host processor operating system, implements the function of this invention by mapping a large, contiguous section of the logical address space on the memory bus to the physical memory address space for specific physical memory addresses. This allows sparsely utilized logically redundant memory address space to be mapped to fixed size and statically located physical address space. The mapping thereby creates a physical address space that appears to be as large as the logical memory address space. This is particularly useful in virtual machine systems such as the JAVA Application Environment (JAE) where object addresses reference virtual memory that must be allocated to physical locations. In this invention the allocation from logical or virtual memory to physical memory locations is greatly simplified compared to the prior art.

DETAILED DESCRIPTION OF THE PREFERRED EMBODIMENTS

Figure 1:
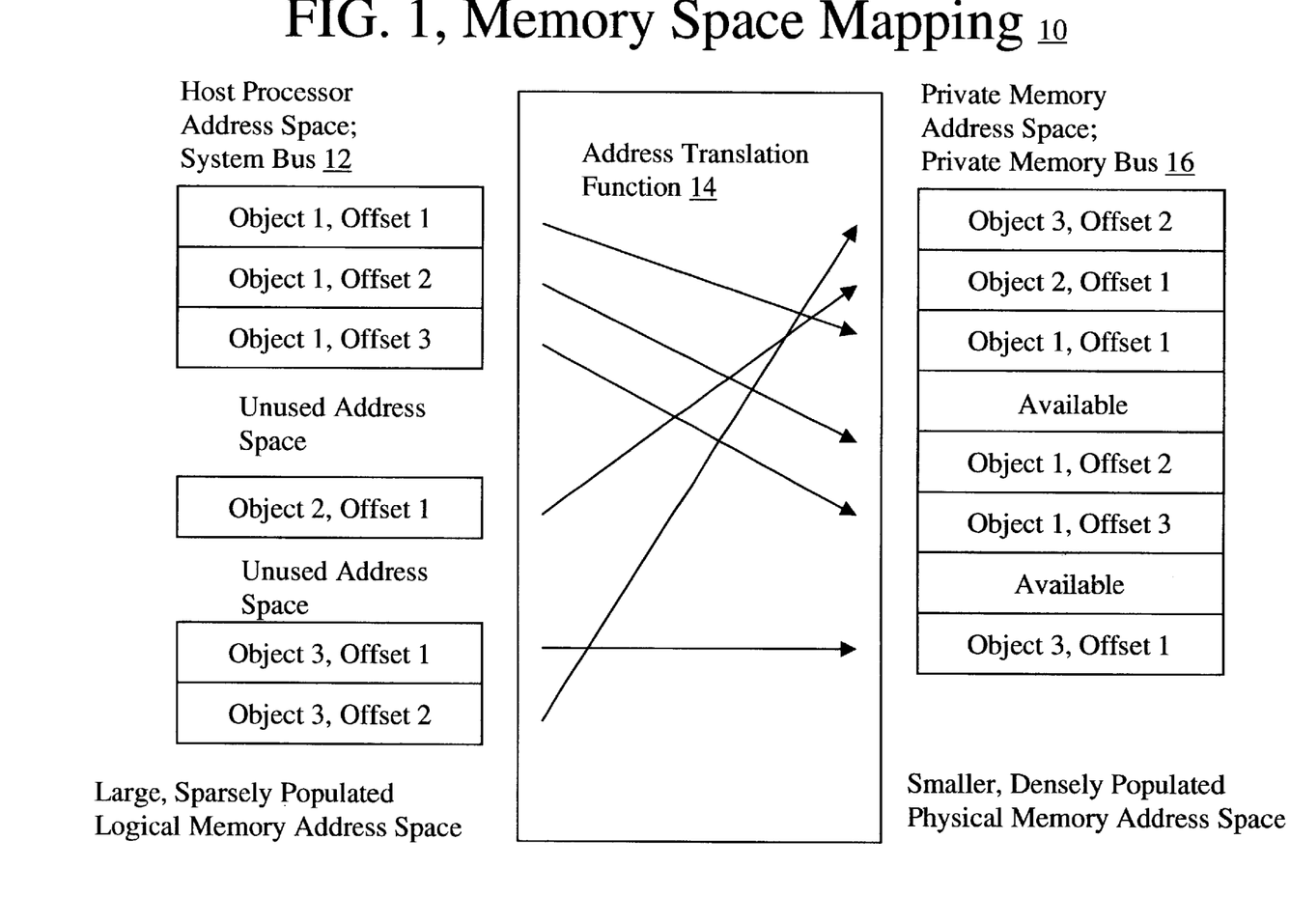
FIG. 1, "Memory Space Mapping" conceptually illustrates mapping from a sparsely populated logical memory address space to a more densely populated physical memory address space.

FIG. 1, "Memory Space Mapping", reference 10, is an illustrative graph showing the nexus of this invention. It illustrates how a "Host Processor Address Space; System Bus", reference 12, which is further described as a "Large, Sparsely Populated Logical Memory Address Space", is mapped by the invention onto a "Private Memory Address Space; Private Memory Bus", reference 16, further noted as a "Smaller, Densely Populated Physical Memory Address Space" in this Figure. The "Host Processor Address Space; System Bus", reference 12, which might be a bus from the computing unit (also referred to as a central processing unit or CPU), is mapped to a physical memory address space defining, e. g., a random access memory (RAM). The bus addresses might contain relatively few valid addresses, which are mapped to a smaller, densely populated, also sometimes referred to as "packed", physical memory. While the illustration seems to imply a one to one mapping, this is not a requirement of the invention. The mapping can be from one logical address to a multiplicity of physical addresses, or a multiplicity of logical addresses may be mapped to a single physical address, or both may define multiple addresses.

Figure 2:
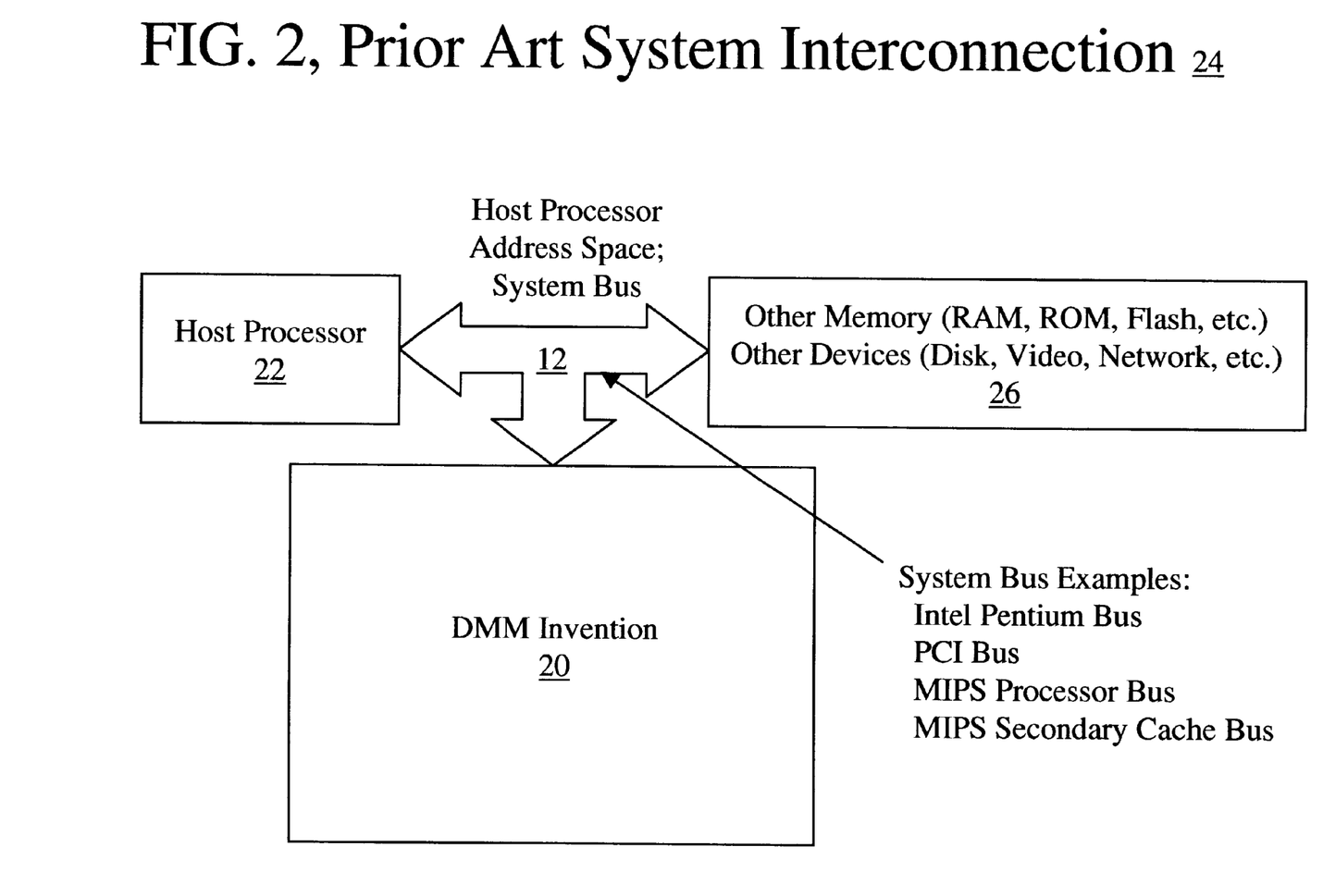
FIG. 2, "Prior Art System Interconnection" shows the invention connected to a prior art computational system such as a computer.

FIG. 2, "Prior Art System Interconnection", reference 24, which is an illustrative graph showing a typical computational system across the top, with a "Host Processor", reference 22, communicating through a "Host Processor Address Space; System Bus", reference 12, with other memory or devices, reference 26. Note that reference 26 could be almost anything associated with a computational system, input/output devices (I/O), other memory (such as RAM or ROM, which could contain conventionally implemented heap space, a term and concept well known in the art), a network interface (e. g., an internet connection), and other devices too numerous to mention. This figure, across the bottom, shows the Dynamic Memory Manager "DMM Invention", reference 20, and a typical connection method to a computational system using the "Host Processor Address Space; System Bus", reference 12.

Figure 3:
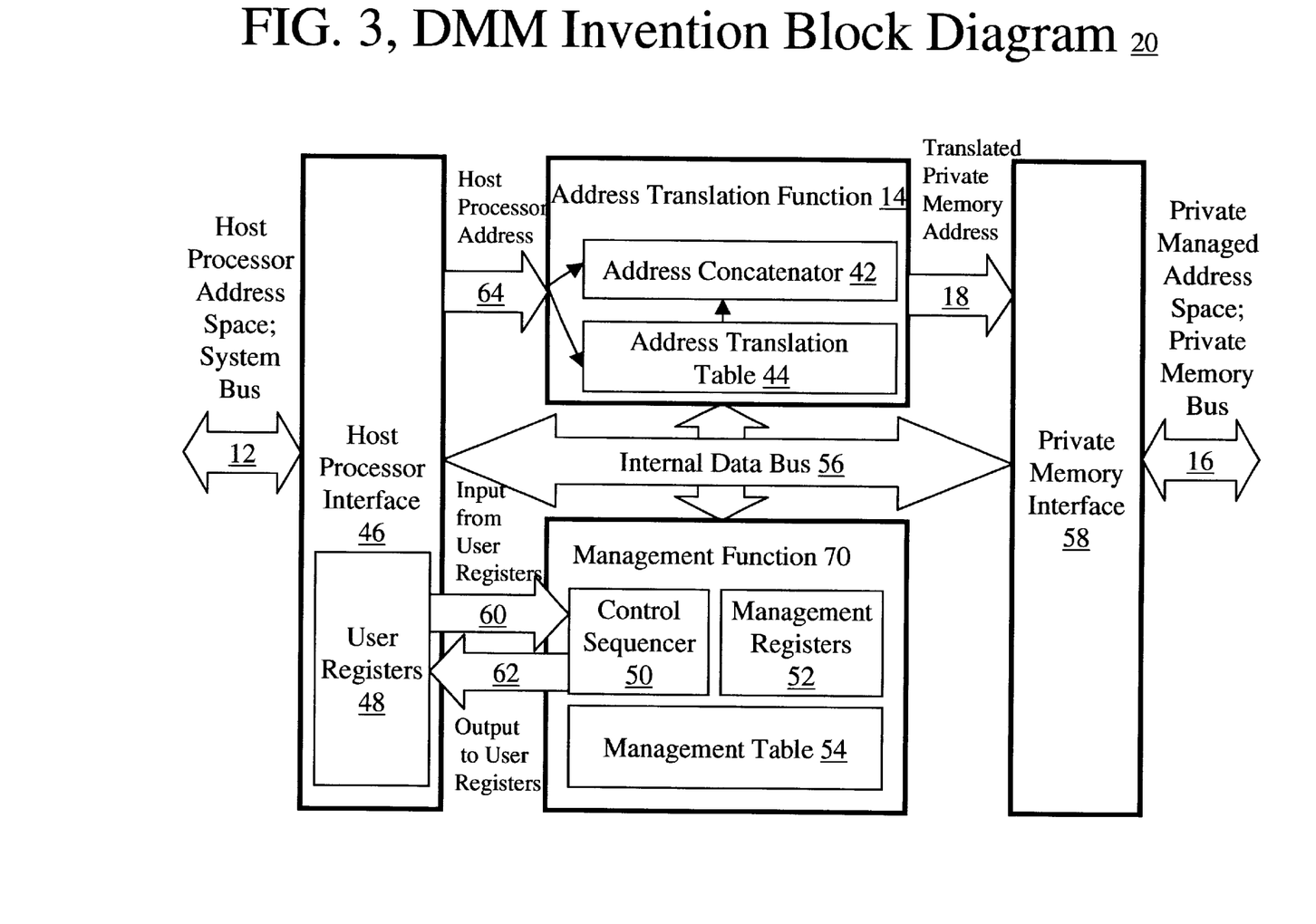
FIG. 3, "DMM Invention Block Diagram" is a more detailed graph of the preferred embodiment of the invention shown in FIG. 2 with details of the internal functions.

FIG. 3, "DMM Invention Block Diagram", reference 20, shows the relationship between the "Address Translation Function", reference 14, the "Management Function", reference 70, the "Host Processor Interface", reference 46, and "Private Memory Interface", reference 58. The "Host Processor Interface", reference 46, on the side connecting to the "Host Processor Address Space; System Bus", reference 12, also comprises the "User Registers", reference 48, used by the host processor to communicate with the DMM. The "Private Memory Interface", reference 58, is on the side that controls the private memory space of this invention, the "Private Memory Address Space; Private Memory Bus", reference 16. The "Address Translation Function", reference 14, is comprised of an "Address Concatenator", reference 42, and an "Address Translation Table", reference 44. Note that the Address Translation Table is not limited to tables, but can be a hardware function as well, such as a Content Addressable Memory (CAM), as long as address mapping is accomplished thereby. The details of the handling of "Host Processor Address", reference 64, are shown on FIG. 10, so the following gives only a general description of it. The "Host Processor Address", reference 64, is connected to the "Address Concatenator", reference 42, and typically the least significant bits will be passed to the "Translated Private Memory Address", reference 18, without change to its numerical value. The "Host Processor Address", reference 64, typically the most significant bits, are also passed to the "Address Translation Table", reference 44, and mapped numerically to a revised address forming at least a part of the "Private Memory Address Space; Private Memory Bus", reference 16. The revised address is then concatenated with the unchanged bits passed through as part of the "Host Processor Address", reference 64, to form "Translated Private Memory Address", reference 18. "Internal Data Bus", reference 56, provides communication within the DMM. This communication is shown to illustrate how the different parts of the invention transfer signals and data to each other as needed. A "Management Function", reference 70, contains a "Control Sequencer", reference 50, "Management Registers", reference 52, and "Management Table", reference 54. These functions interact with the "User Registers", reference 48, which in this embodiment are within the "Host Processor Interface", reference 46. As shown, the "Control Sequencer", reference 50, is accessed by way of the "Input from User Registers", reference 60, and "Output to User Registers", reference 62. As shown in more detail in other figures, the "User Registers" set up parameters for the control of the DMM invention, such as information about memory allocations, diagnostic data, or status information. These parameters are then loaded by the "Control Sequencer", reference 50, into the "Management Registers", reference 52, and the "Management Table", reference 54, as parameters for the DMM operation.

Figure 4:
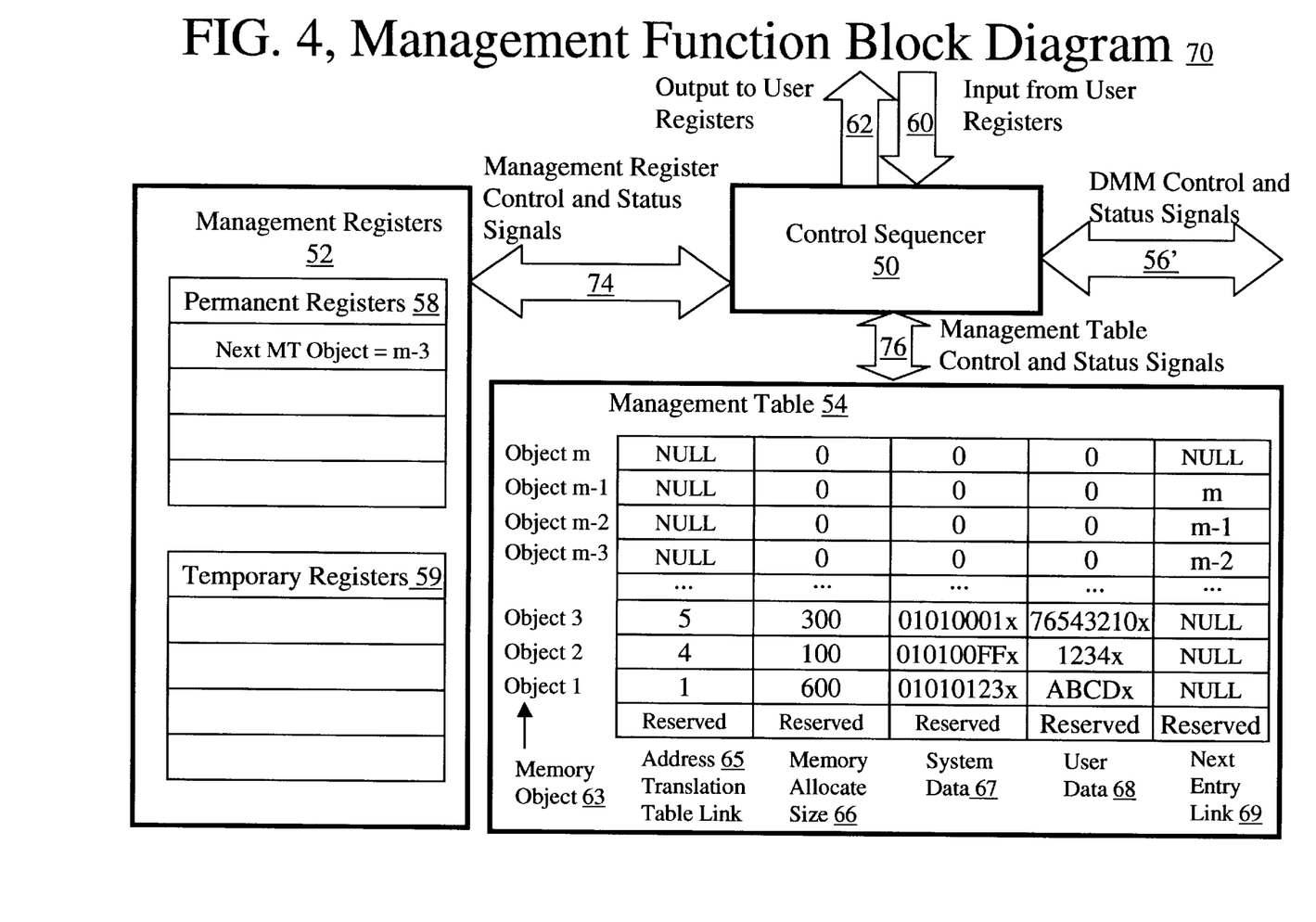
FIG. 4, "Management Function Block Diagram" illustrates the components of the Management Function for the preferred embodiment of the invention introduced in FIG. 3 as "Management Function".

FIG. 4, "Management Function Block Diagram", reference 70 also referred to as "Management Function" in FIG. 3, is a more detailed view. The "Control Sequencer", reference 50, is shown to communicate with the "Management Registers", 52, by the "Management Register Control and Status Signals", reference 74. The "Control Sequencer", reference 50, is further detailed in FIG. 5 through FIG. 9 inclusive, and is also shown to communicate with the "Management Table", reference 54, by way of "Management Table Control and Status Signals", reference 76. Details of the preferred form of the internal structures of both "Management Registers", reference 52, and "Management Table", reference 54, are shown. "DMM Control and Status Signals", reference 56', while not shown in FIG. 3, are shown in this Figure, and form a part of the "Internal Data Bus", reference 56 in FIG. 3.

"Management Table", reference 54, in the preferred embodiment, contains entries for each "Memory Object", reference 63, active in the DMM. Each entry comprises "Memory Allocate Size", reference 66, "Address Translation Table Link", reference 65, "Next Link Entry", reference 69, and optional "System Data", reference 67, and "User Data", reference 68. Unused table entries are organized as a prior art linked list using the "Next Link Entry", reference 69. Entries are removed from the list for allocations, and added to the list for memory object release. FIG. 4 shows a "Management Table", reference 54, example with three allocated memory objects of varying size added after DMM initialization.

Optional "System Data", reference 67, provides OS specific diagnostic information associated to each memory object comprising Processor ID, Task ID, Thread ID. The optional "User Data", reference 68, provides task or thread specific diagnostic information associated to each memory object. Compilers optionally provide source code line tag number or other information associated with memory object allocation or release. Optional diagnostic columns for the "Management Table", reference 54, comprise: access counts, access counts during an interval with counter reset, access limit timers with associated limit maximums and/or minimums provide frequent or minimum access notification. The optional "System Data", reference 67, or "User Data", reference 68, are used in conjunction with an optional command to release all allocated objects associated with a particular processor ID, task ID, thread ID, function number, or similar value stored in the "System Data", reference 67, or "User Data", reference 68, resulting in a further reduction of housekeeping functions by the "Host Processor", reference 22 in FIG. 2.

"Management Registers", reference 52, comprise "Permanent Registers", reference 58, and "Temporary Registers", reference 59, that provide working data for the DMM. These registers contain information about the "Address Translation Function", reference 14 FIG. 1, and the "Management Function", reference 70. "Permanent Registers", reference 58, comprise: maximum size of a memory object, number of free entries in "Management Table", reference 54, pointer to next free entry in "Management Table", reference 54, number of free entries in "Address Translation Table" reference 14 in FIG. 1, and pointer to next free entry in "Address Translation Table" reference 14 in FIG. 1. "Temporary Registers", reference 59, comprise: memory size requested, calculated number of "Address Translation Table", reference 14 in FIG. 1, entries.

Figure 5:
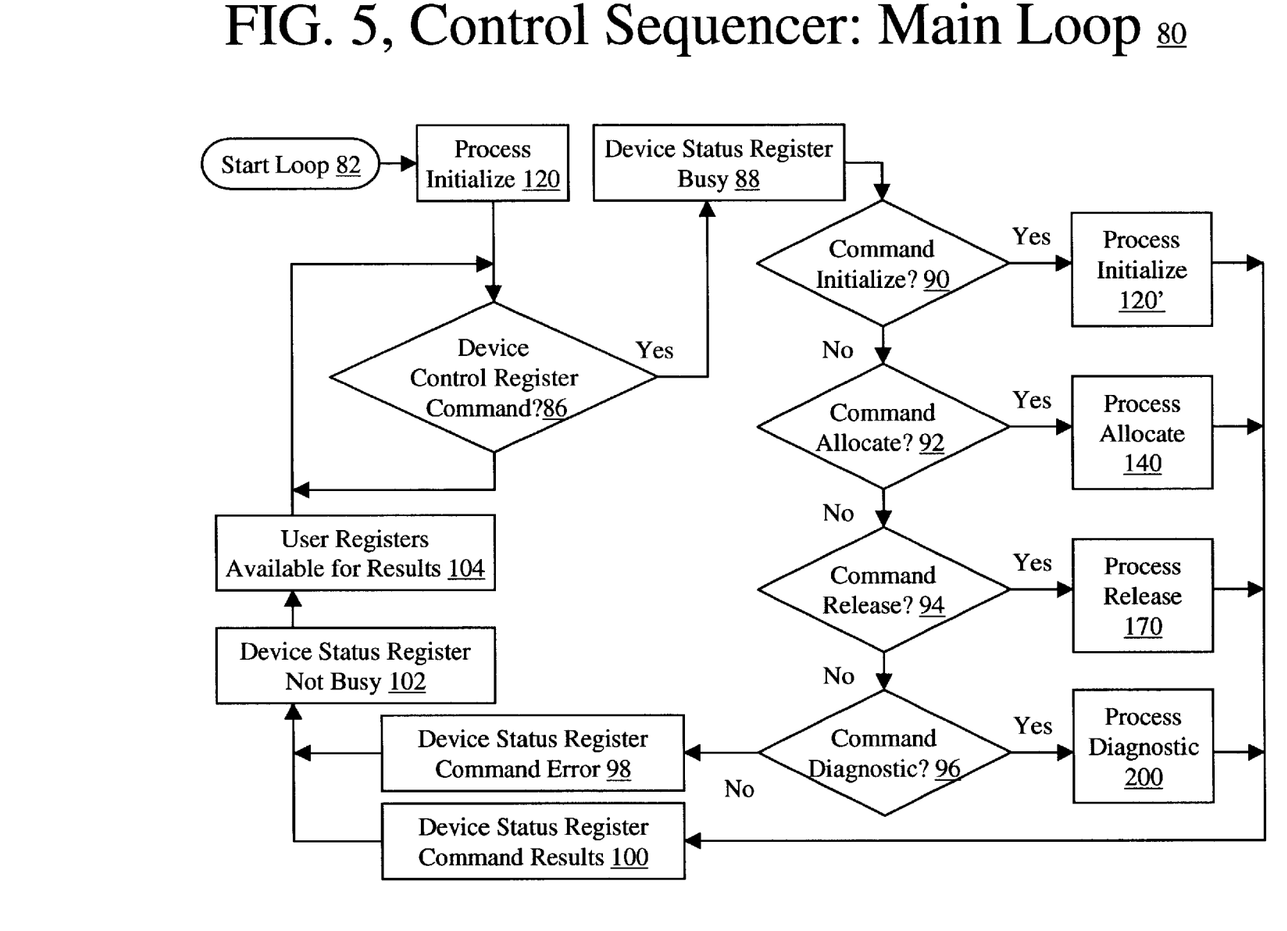
FIG. 5, "Control Sequencer: Main Loop" illustrates the monitoring for, execution of, and result reporting for the execution of user commands by the Management Function introduced in FIG. 4.

FIG. 5, "Control Sequencer: Main Loop", reference 80, is a flow chart for the management routine of the invention. The "Start Loop", reference 82, command for this function is entered from the operating system for a software implementation, or could be initiated by a reset signal for a hardware implementation, when the host computer is first initialized or powered up for operation. "Process Initialize", reference 120, for this process is an initialization function to set all device components into a known initial state. The initialization is always invoked prior to entering the main loop, re-initialization is also a command option available within the main loop, "Process Initialize", reference 120', to return the DMM to a known state. The loops associated with the "Device Control Register Command?", reference 86, herein do not have an explicit system exit, and form a "daemon", as it is commonly known in the art, continuously monitoring and controlling the memory of this invention. First, when the branch test for the "Device Control Register Command", reference 86, is true or "Yes", a "Device Status Register Busy", reference 88, indication is made, which in the preferred embodiment sets a flag bit. The term flag bit has the meaning normally accepted by those skilled in the art, and is an indicator function.

The Command is then tested by a program switch routine such as a "case" statement, to determine what DMM function is required. Each of the allowed functions is tested in turn. In the preferred embodiment, the first is "Command Initialize?", reference 90, which branches to the subroutine, "Process Initialize", reference 120'. Next is "Command Allocate?", reference 92, which branches to the subroutine "Process Allocate", reference 140. The third is "Command Release?", reference 94, which branches to subroutine "Process Release", reference 170. The fourth is "Command Diagnostic?", reference 96, which branches to the subroutine "Process Diagnostic", reference 200. If none of the allowed functions test true, the test exits into a "Device Status Register Command Error", reference 98, which will be used to indicate that the host processor requested that the DMM perform an invalid or non-existent function. If any of the branch conditions are true or "Yes", the routine performing that function is entered (detailed elsewhere in the Figures), and on completion, an exit back to this Figure is executed. A "Device Status Register Command Results", reference 100, routine, which is used for reporting results of the functions and other memory status, is then performed. After completion of either "Device Status Register Command Results", reference 100, or "Device Status Register Command Error", reference 98, a "Device Status Register Not Busy", reference 102, indication is made. In the preferred embodiment, the "Device Status Register Not Busy", reference 102, indication resetsthe flag bit described in the discussion of the "Device Status Register Busy" function, reference 88. The "User Registers Available for Results", reference 104, is the indication that the user registers, which are manipulated by the "Host Processor", reference 22 in FIG. 2, have data which is available to the computer for use. In the "Device Register Control Command?", reference 86, branch test, failure of the test (the branch other than the "Yes") causes a loop around the "Device Register Control Command?", reference 86, branch test to be performed until a condition causing a "Yes" is encountered. Since both of the above loops are closed, the "daemon", as it is commonly known in the art, never exits or completes operation. The daemon is exited only when the DMM is powered down or reset.

Figure 6:
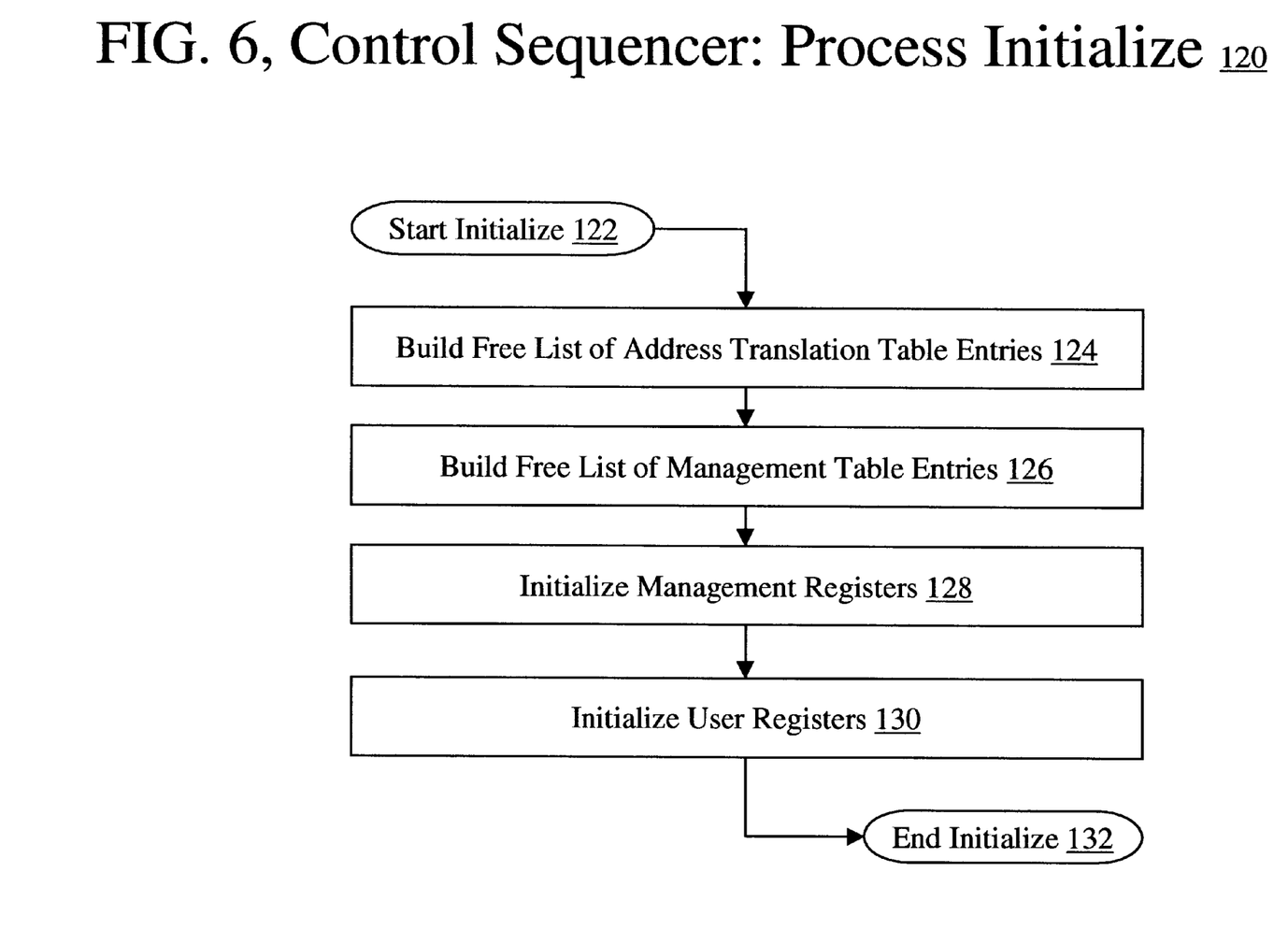
FIG. 6, "Control Sequencer: Process Initialize" illustrates the setup or initialization of the invention in accordance with FIG. 5, "Process Initialize".

FIG. 6, "Control Sequencer: Process Initialize", reference 120, the computer used with this invention, the user, or some other form of control invokes "Control Sequencer: Process Initialize", reference 120, to set all the device components of this invention into a known initial state. The set up sequence is input at "Start Initialize", reference 122, from the "Yes" branch of "Command Initialize", reference 90, or from "Start Loop", reference 82, both contained in FIG. 5. The sequential steps "Build Free List of Address Translation Table Entries", reference 124, "Build Free List of Management Table Entries", reference 126, "Initialize Management Registers", reference 128, "Initialize User Registers", reference 130, are all routines to prepare the various registers, lists, and tables for use. For example, in some cases the data is initialized to avoid "garbage data" from appearing available to the host system, thereby causing a possible erroneous result to occur. The final step in this sequence is "End Initialize", reference 132, which is a return to "Device Status Register Command Results", reference 100, or "Device Control Register Command?", reference 86, both contained in FIG. 5.

Figure 7:
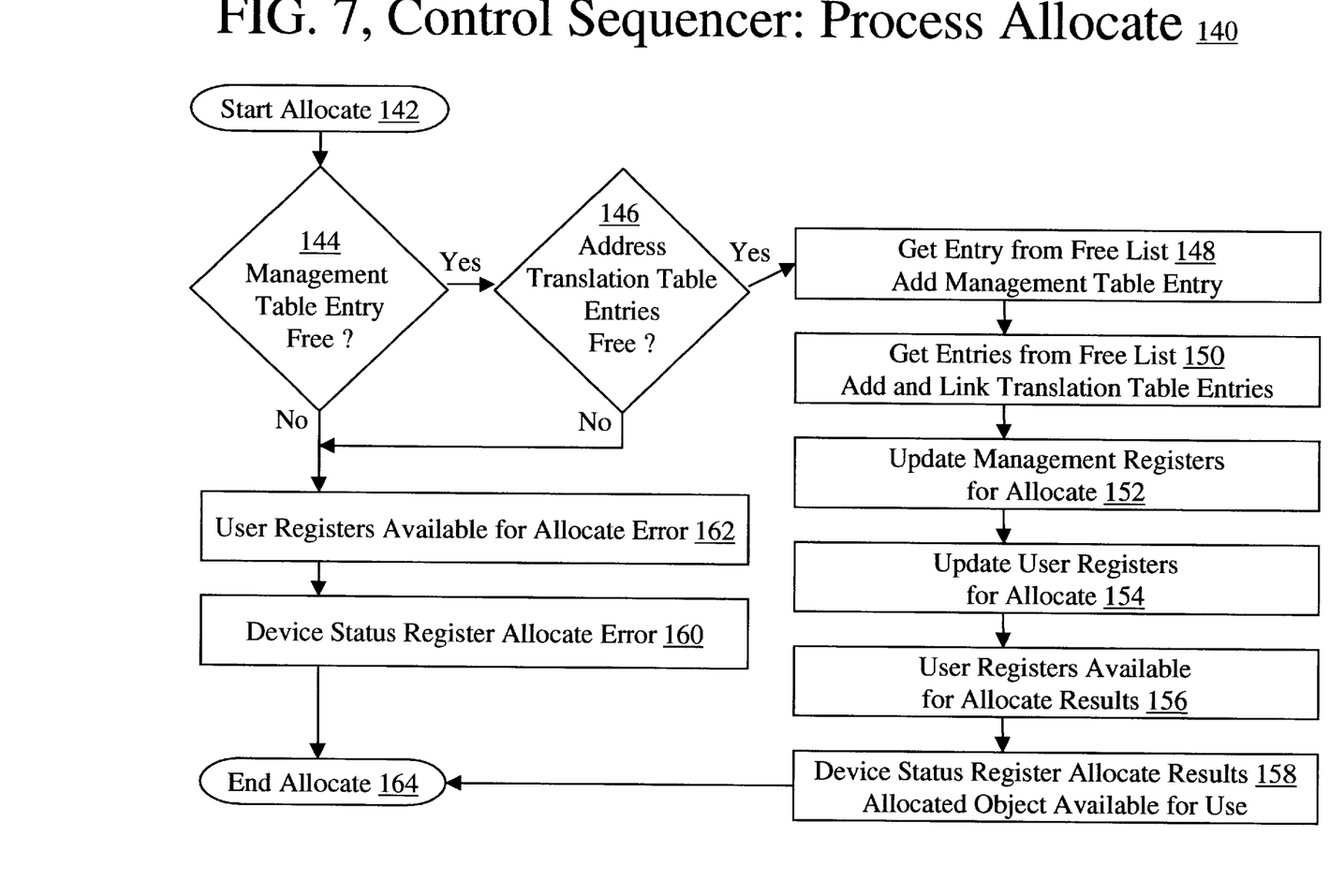
FIG. 7, "Control Sequencer: Process Allocate" illustrates how memory is allocated in accordance with FIG. 5, "Process Allocate".

FIG. 7, "Control Sequencer: Process Allocate", reference 140, controls memory allocations. After receiving a command in the "Start Allocate", reference 142, from FIG. 5, "Yes" branch of "Command Allocate", reference 92, the sequence progresses to the "Management Table Entry Free?", reference 144, test. If this test is true or "Yes", a "Address Translation Entries Free?", reference 146, branch test is made for free locations in the "Address Translation Table", reference 14 in FIG. 1. Assuming both of the above tests succeed, entries are then made to the "Management Table", reference 54 in FIG. 3, by the "Get Entry from Free List Add Management Table Entry", reference 148. As many of the Address Translation Table entries as are needed to accommodate the memory request in the "Start Allocate", reference 142, entry above are allocated and, if necessary, linked, in the "Get Entries from Free List Add and Link Translation Table Entries", reference 150. In the preferred embodiment, a known "linked list" of the prior art is used. Then the "Management Table", reference 54 in FIG. 3, entries are updated to reflect the state of the "Address Translation Table", reference 14 in FIG. 1, and registers associated with it in "Update Management Registers for Allocate", reference 152.

Next the "User Registers", reference 48 in FIG. 3, are updated as required to reflect the data being input or output in accordance with this invention with the "Update User Registers for Allocate", reference 154. Status flags or notifications as required are updated to reflect which User Registers are available for use with the "User Registers Available for Allocate Results", reference 156. Then with the "Device Status Register Allocate Results Allocated Object Ready for Use", reference 158, the operations are finalized and notification is made. In the final step, "End Allocate", reference 164, this function is exited, as discussed below. If either of the tests "Management Table Entry Free?", reference 144, or "Address Translation Table Entries Free?", reference 146, fail or "No", a "User Registers Available for Allocate Error", reference 162, advisory and a "Device Status Register Allocate Error", reference 160, are generated. The final step in this sequence is "End Allocate", reference 164, which is a return to FIG. 5, "Device Status Register Command Results", reference 100. Preferably the mapping illustrated above is of variable sized logical memory objects to fixed sized physical memory elements in a lookup table in a Content Addressable Memory (CAM).

Figure 8:
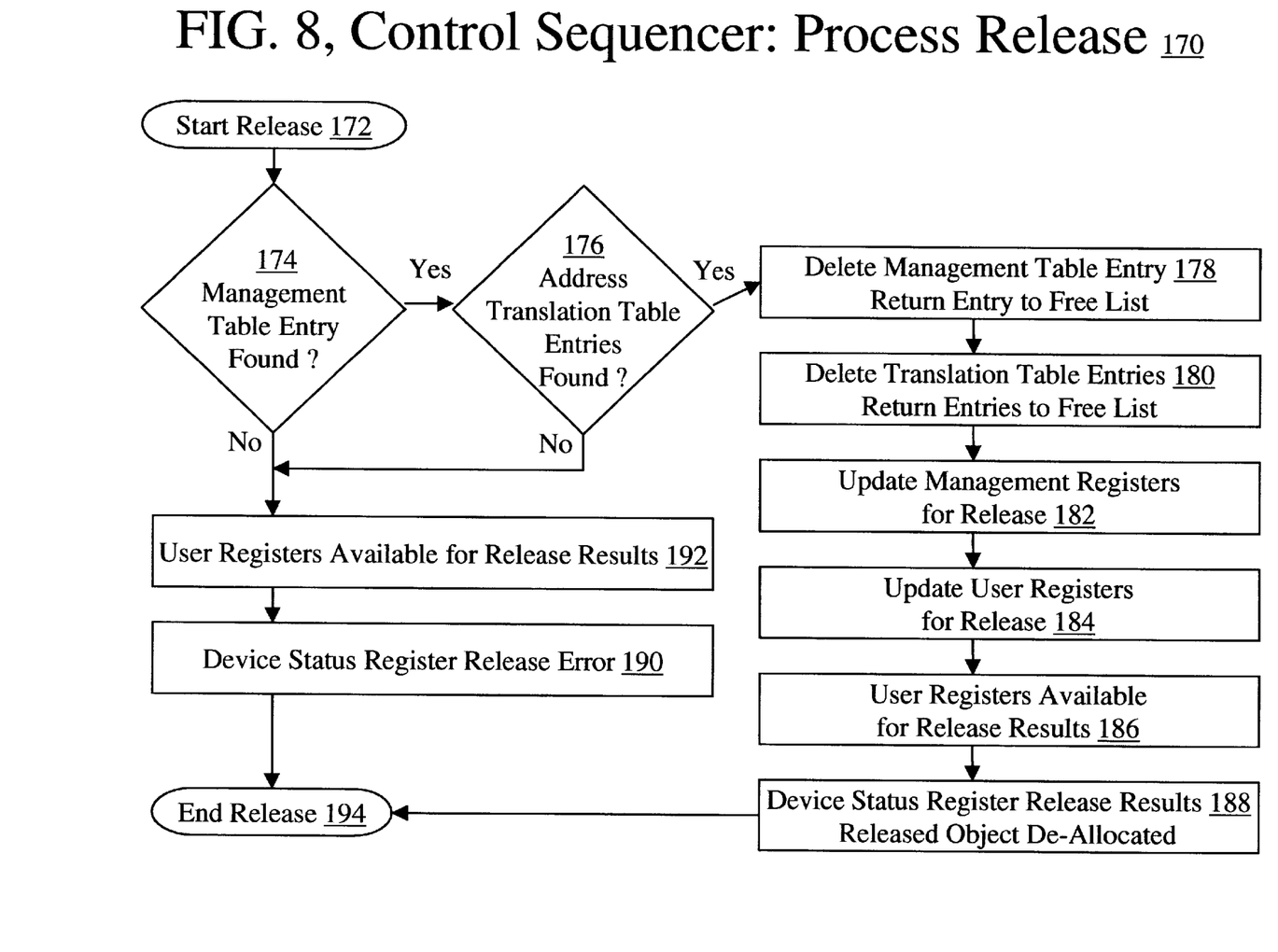
FIG. 8, "Control Sequencer: Process Release" illustrates how memory is released in accordance with FIG. 5, "Process Release".

FIG. 8, "Control Sequencer: Process Release", reference 170, the entry point "Start Release", reference 172; which is invoked from "Command Release?", reference 94 of FIG. 5, the "Yes" branch; invokes "Management Table Entry Found?", reference 174, which is an existence test for the specific Management Table Entry. If true or "Yes", the "Address Translation Table Entry Found?", reference 176, test is invoked, which is also an existence test. If both tests are true or "Yes", the "Delete Management Table Entry Return Entry to Free List", reference 178, subroutine frees the "Management Table", reference 54 in FIG. 3, entry, then the "Delete Translation Table Entries Return Entries to Free List", reference 180, frees the "Address Translation Table", reference 14 in FIG. 1, entry. Next, the "Update Management Registers for Release", reference 182, and "Update User Registers for Release", reference 184, update the registers. The subsequent step, "User Registers Available for Release Results", reference 186, notifies the system that the "User Registers", reference 48 in FIG. 3, are available. Next, the "Device Status Register Release Results Released Object De-Allocated", reference 188, notifies the "Host Processor, reference 22 in FIG. 3, that the dynamic memory object released by the previous steps is no longer accessible.

In branch tests "Management Table Entry Found?", reference 174, and "Address Translation Table Entries Found?", reference 176, failure of either test or "No" invokes "User Register Available for Release Results", reference 192, and then creates a "Device Status Register Release Error", reference 190, which sets "User Register", reference 48 in FIG. 3, errors. The final step in the sequence ending in "Device Status Register Release Results Released Object De-Allocated", reference 188, and in the sequence ending in "Device Status Register Release Error", reference 190, is "End Release", reference 194. This is a return to FIG. 5, "Device Status Register Command Results", reference 100.

Figure 9:
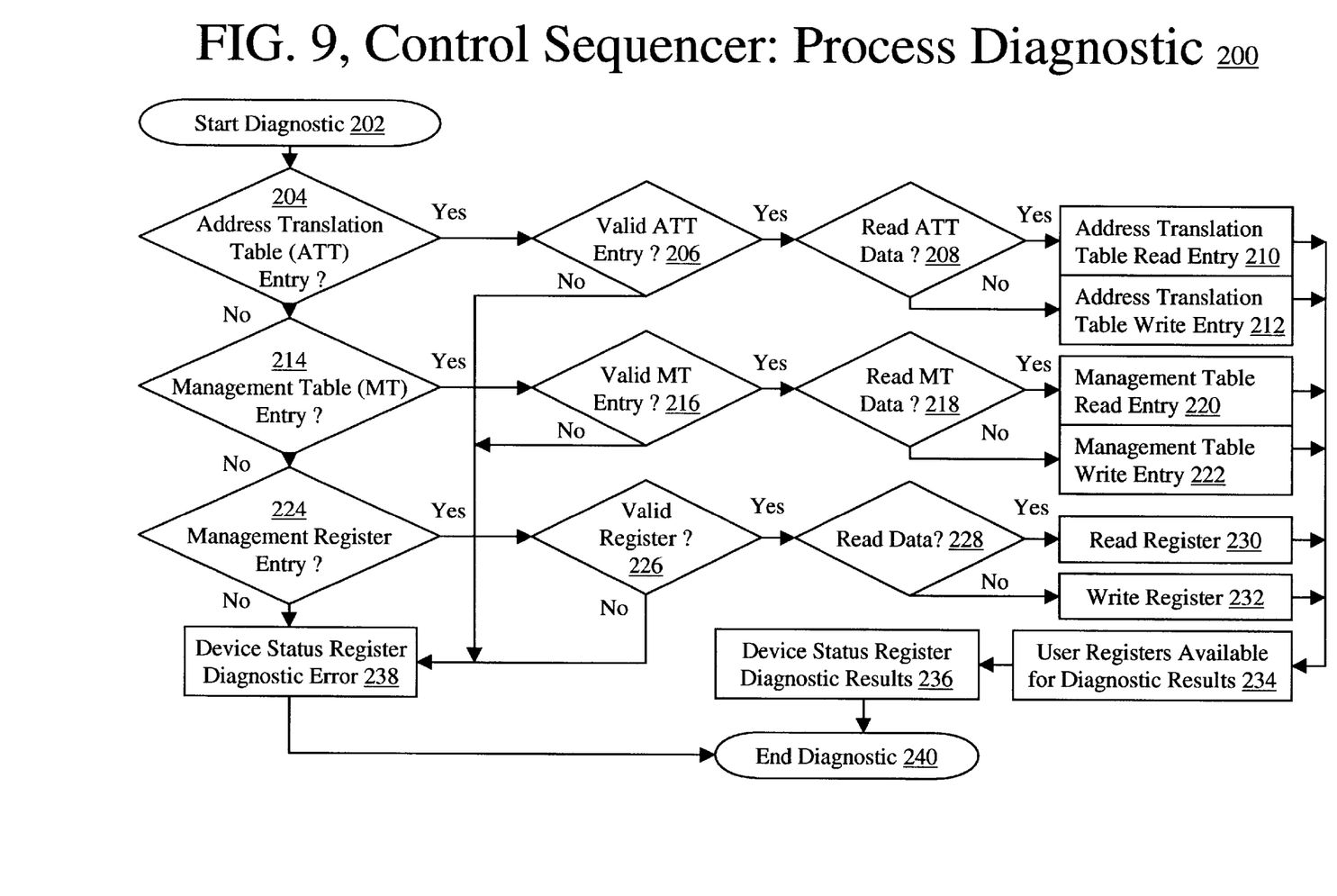
FIG. 9, "Control Sequencer: Process Diagnostic" illustrates how diagnostic data are read from or written to in accordance with FIG. 5, "Process Diagnostic".

FIG. 9 "Control Sequencer: Process Diagnostic", reference 200, the "Start Diagnostic", reference 202, which is entered from the "Yes" branch of FIG. 5; "Command Diagnostic" reference 96, sequences to the "Address Translation Table (ATT) Entry?", reference 204, test. If this test is true or "Yes", the sequence continues to "Valid ATT Entry?", reference 206, which is known in the art as a bounds test. Next another branch test, "Read ATT Data?", reference 208, is conducted, and if true or "Yes" a table entry is read with the "Address Translation Table Read Entry", reference 210, subroutine; otherwise, the "No" branch results in a table entry written with the "Address Translation Table Write Entry", reference 212, subroutine. If the "Address Translation Table (ATT) Entry?", reference 204, test is false, the "No" branch is followed, and the "Management Table (MT) Entry?", reference 214, branch test is entered. If this test is true or "Yes", another bounds test "Valid MT Entry?", reference 216, is performed. If this test is true or "Yes", a "Read MT Data?", reference 218, test is made. Success or "Yes" on this test causes a table entry to be read with the "Management Table Read Entry", reference 220, subroutine, otherwise, the "No" branch results in the table entry being written with the "Management Table Write Entry" reference 222, subroutine. If the "Management Table (MT) Entry?", reference 214, test fails or is "No", the "Management Register Entry?", reference 224, branch test is performed. Success or "Yes" causes a "Valid Register?", reference 226, bounds test to be made. If this test is true or "Yes", a "Read Data?", reference 228, test is conducted, success or "Yes" causes a register to be read with the "Read Register", reference 230, subroutine, and failure or "No" causes the register to be written with the "Write Register", reference 232, subroutine.

In all the above cases involving invocation of the read or write commands, references 210, 212, 220, 222, 230, or 232, the next step is the "User Registers Available for Diagnostic Results" reference 234, which then continues to the "Device Status Register Diagnostic Results", reference 236, notification. If any of the tests for bounds, references 206, 216, or 226, or the "Management Register Entry", reference 224, test, is false, or "No", the "Device Status Register Diagnostic Error", reference 238, subroutine is performed. Either device status register step, references 236 or 238, then enters the "End Diagnostic", reference 240, function, which then causes a return to FIG. 5 "Device Status Register Command Results" reference 100.

Figure 10:
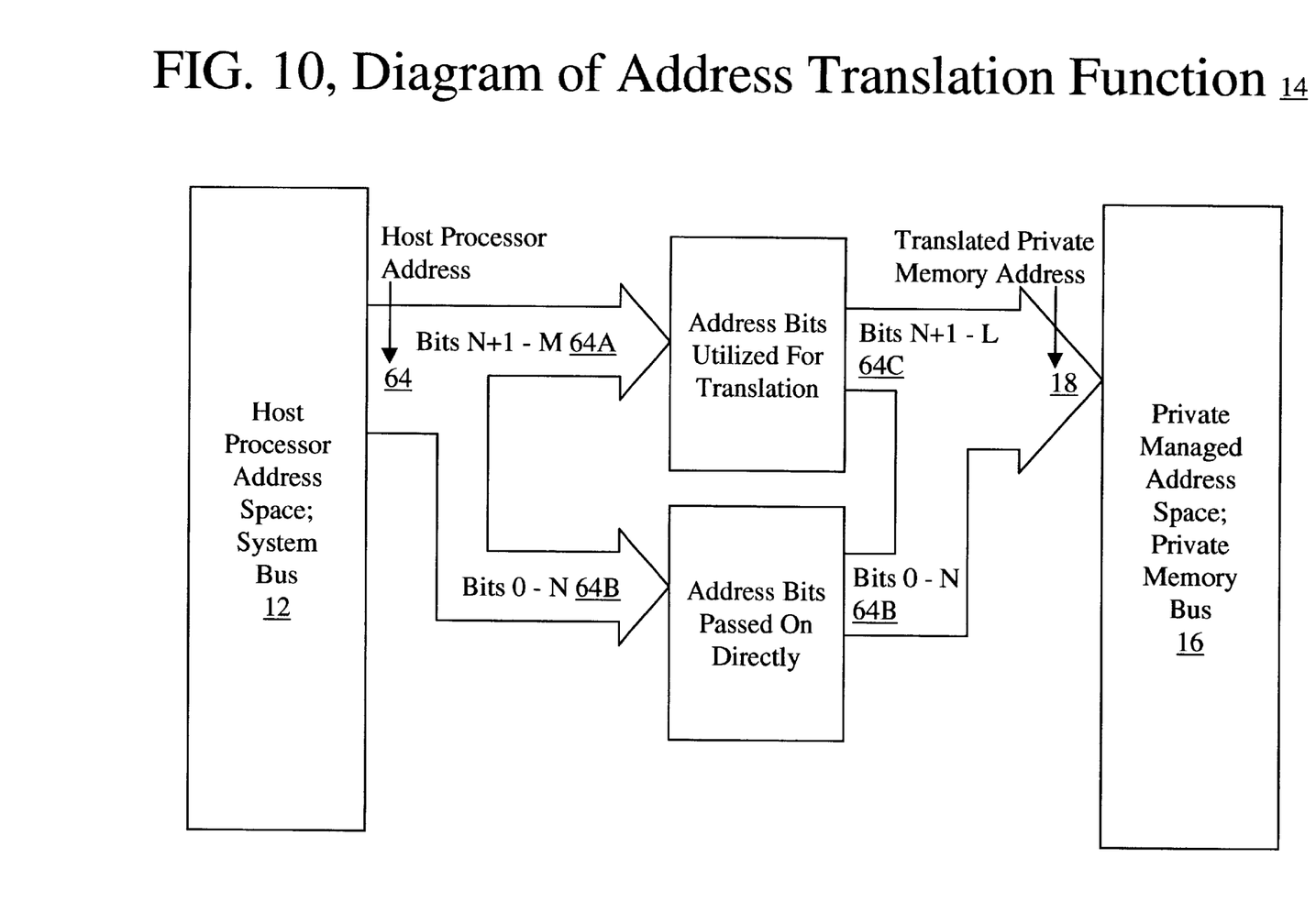
FIG. 10, "Diagram of Address Translation Function" is a more detailed graph of the address mapping from the logical memory address space, called host processor address space, to the physical memory address space, called private memory address space, shown in FIG. 1, also shown with more detail in FIG. 3.

FIG. 10 "Diagram of Address Translation Function", reference 14, also referred to as "Address Translation Function", reference 14 in FIG. 1, shows the "Host Processor Address", reference 64, supplied by the computer from the "Host Processor Address Space; System Bus", reference 12. In reference 64, including 64A, 64B, and 64C, "N" refers to an arbitrary number selected from within the range of bits in this address, and "M" and "L" are the maximum number of the bits in these address spaces. "M" is larger than "L" in this invention. A subset, reference 64A, of "Host Processor Address", reference 64, is concatenated, without otherwise changing, with subset 64C, after the subset 64B has been mapped to subset 64C in accordance with this invention. In the preferred embodiment, the concatenation function will be in the "Address Concatenator", reference 42 in FIG. 3, but may also be accomplished as shown in this figure. The output of the "Address Translation Function", reference 14 in FIG. 1, is "Translated Private Memory Address", reference 18, which is used to access the "Private Managed Address Space; Private Memory Bus", reference 16.

Figure 11:
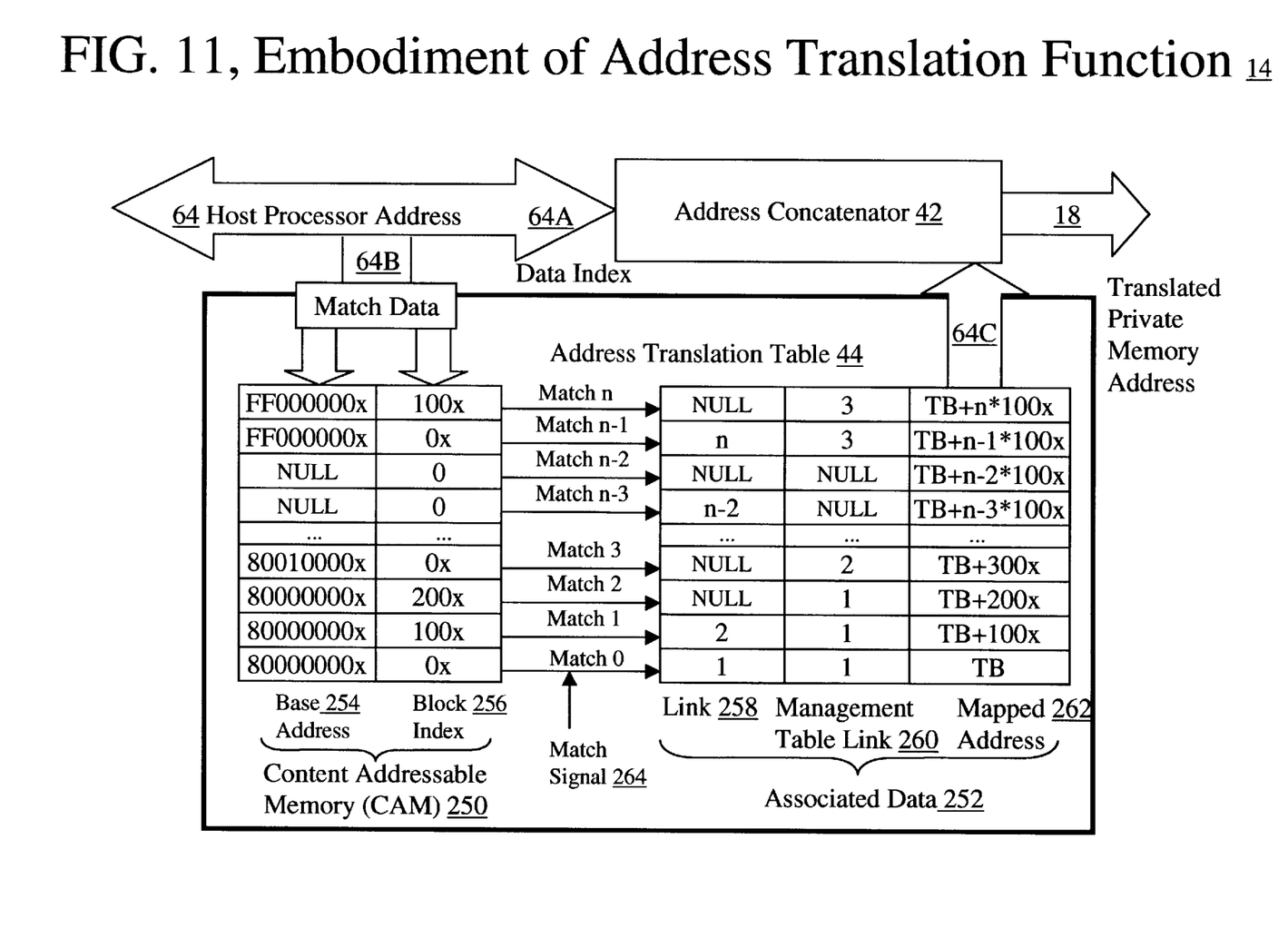
FIG. 11, "Embodiment of Address Translation Function" is a graph of the detailed operation of a preferred embodiment of the "Address Translation Function" shown in FIG. 3, illustrating how the translation is implemented in a practical system.

FIG. 11 "Embodiment of Address Translation Function", reference 14, also referred to as "Address Translation Function", reference 14 in FIG. 1, shows how, in the preferred embodiment, the "Host Processor Address", reference 64, is divided into two subsets: 64A and 64B. Subset 64B is further divided into a "Base Address", reference 254, and a "Block Index", reference 256, which provide the match fields for the "Content Addressable Memory (CAM)", reference 250. If the "Base Address", reference 254, and "Block Index", reference 256, match an entry in the "Content Addressable Memory (CAM)", reference 250, the corresponding "Match Signal", reference 264, is asserted. This selects the "Associated Data", reference 252, as the source for the mapped subset, reference 64C, of the "Translated Private Memory Address", reference 18. "Address Translation Table", reference 44, comprises a "Content Addressable Memory (CAM)", reference 250, and "Associated Data", reference 252. The "Content Addressable Memory (CAM)", reference 250, comprises "Base Address", reference 254, and "Block Index", reference 256, fields. The "Associated Data", reference 252, comprises "Link", reference 258, "Management Table Link", reference 260, and "Mapped Address", reference 262, fields. This figure illustrates the "Address Translation Table", reference 44, containing three memory objects. The first object is located at "Host Processor Address", reference 64, address 0x80000000 and occupies three separately mapped segments of private memory located at Translation Base (TB), TB+N*100x, and TB+N*200x, each with a size of 100x as shown in the bottom three entries in the block index, reference 256. The "Link", reference 258, field in the "Associated Data", reference 252, is used to organize the entries for a single object in a prior art linked list The "Management Table Link", reference 260, associates each entry of the "Address Translation Table", reference 44, with an entry of the "Management Table", reference 54 in FIG. 3. The "Mapped Address", reference 262, field contains the mapped subset, reference 64C, used by the "Address Concatenator", reference 42, in conjunction with subset 64A of the "Host Processor Address", reference 64 to generate the "Translated Private Memory Address", reference 18.

We claim:

1. A method for eliminating memory fragmentation and garbage collection in a computer system, the method comprising:
   receiving a request to allocate a memory block for storing an object;
   allocating a first memory block in a first address space for storing the object;
   allocating a second memory block in a second address space for storing the object, wherein the allocated second memory block is of a larger size than the allocated first memory block; and
   storing an association between the first memory block and the second memory block.

2. The method of claim 1, wherein the request to allocate a memory block specifies the size of the object, and wherein the allocated first memory block has the requested size.

3. The method of claim 1, wherein the second address space further comprises a plurality of contiguous memory blocks.

4. The method of claim 1, wherein the step of allocating a first memory block further comprises the step of allocating a plurality of non-contiguous memory elements mapped to the allocated second memory block, and wherein the storing step further comprises:
   storing associations between the second memory block and the plurality of non-contiguous memory elements.

5. The method of claim 1, wherein the step of allocating a first memory block further comprises the step of allocating a plurality of non-contiguous memory elements, and wherein the plurality of non-contiguous memory elements having a combined size of at least great enough to store the object.

6. The method of claim 1, wherein the step of storing associations further comprises:
   returning a second address for the allocated second memory block;
   for each second address, determining a first address for the allocated first memory block; and
   storing an association between the second address and the first address.

7. The method of claim 6, wherein the step of storing an association between the second address and the first address further comprises:
   storing an association between the second address and a plurality of addresses for each non-contiguous memory element mapped to the second memory block.

8. The method of claim 6, wherein the second address further comprises a plurality of address bits utilized for translation and pass-through address bits not utilized for translation, and wherein the step of determining the first address further comprises:
   translating the plurality of address bits utilized for translation to a mapped address; and
   concatenating the pass-through address bits with the mapped address to generate the first address.

9. The method of claim 8, further comprising:
   determining whether the plurality of address bits utilized for translation match a base address field and a block index field in an associative memory element of an address translation table;
   responsive to the address bits utilized for translation matching the base address field and the block index field, returning a mapped address for the stored object.

10. The method of claim 9, further comprising:
    responsive to the plurality of address bits utilized for translation not matching the base address field and the block index field in the associative memory element, returning an error indicating that an object is not stored at the second address.

11. The method of claim 1, wherein the second memory block is a block of addresses.

12. The method of claim 1, wherein the step of allocating a second memory block further comprises:
    creating a management table entry from a list of free management table entries, the created entry associated with the stored object; and
    creating at least one address translation table entry linked to the created management table entry.

13. The method of claim 12, further comprising:
    removing the management table entry corresponding to the stored object chosen for deallocation; and
    removing a plurality of address translation table entries linked to the removed management table entry associated with the stored object chosen for deallocation.

14. The method of claim 1, wherein the first address space is a physical address space and the second address space is a logical address space.

15. The method of claim 1, further comprising:
    receiving a request to access an object at an address;
    responsive to not finding the object at the address, returning an error indicating that an object is not stored at the received address.

16. In a computer device, a system for eliminating memory fragmentation and garbage collection, the system comprising:
  a management module for receiving a request to allocate a memory block for storing an object, and for allocating a first memory block for storing the object in a first address space, and a second memory block for storing the object in a second address space, wherein the allocated second memory block is of a larger size than the allocated first memory block; and
  an address translation module for storing an association between the allocated first memory block and the second memory block.

17. The system of claim 16, wherein the management module further deallocates the first memory block and the second memory block.

18. The system of claim 16, wherein the management module further comprises:
  a control sequencer for receiving a set of host processor commands and for executing the set of host processor commands, each host processor command relating to the stored object;
  a management table accessible by the control sequencer, the management table having a plurality of entries, each entry for storing data associated with each stored object; and
  a plurality of management registers for storing a set of parameters resulting from the execution of the set of host processor commands.

19. The system of claim 18, wherein the control sequencer further creates an entry in the management table from a list of free management table entries, each created entry associated with the stored object, and wherein the control sequence further creates at least one address translation table entry linked to the created management table entry.

20. The system of claim 19, wherein the stored object has a plurality of offsets, and wherein the number of entries in the address translation table for each stored object corresponds to a number of offsets included in each stored object.

21. The system of claim 18, wherein the set of the stored parameters is selected from at least one of a number of free entries in the management table, a maximum size of the stored object, a pointer to a next free entry in the management table; a number of free entries in an address translation table, a pointer to a next free entry in an address translation table, a user data indicating a task-specific diagnostic information associated with each object.

22. The system of claim 18, wherein the control sequencer determines whether the host processor erroneously attempted to access an object which is not stored.

23. The system of claim 18, wherein each entry in the management table includes a field indicating a size allocated for the associated object.

24. The system of claim 18, wherein each entry in the management table includes a field indicating an address translation table link.

25. The system of claim 18, wherein the management table further comprises a plurality of unused entries, each unused entry including a field pointing to a next unused entry.

26. The system of claim 18, wherein each entry in the management table includes a system data field indicating operating system (OS) diagnostic information for the associated object.

27. The system of claim 26, wherein the diagnostic information comprises at least one of a processor ID, a task ID, and a thread ID.

28. The system of claim 18, wherein each entry in the management table includes a user data field indicating task-specific diagnostic information for the associated object.

29. The system of claim 16, wherein the first address space is a physical address space and wherein the second address space is a logical address space.

30. The system of claim 16, wherein the request to allocate specifies the size of the object, and wherein the allocated first memory block has the requested size.

31. The system of claim 16, wherein the address translation module further comprises:
  an address translation table for receiving an address of the stored object in the second address space and for translating the address to a mapped address; and
  an address concatenator for receiving pass-through address bits from the address and for concatenating the pass-through address bits with the mapped address to form a first address of the stored object in the first address space.

32. The system of claim 31, wherein the plurality of address bits utilized for translation further comprise a base address, and wherein the address translation table further includes:
  an associative memory element having a plurality of entries, each entry corresponding to at least one stored object, each stored object having a base address indicating where the object starts in the second address space, and block index indicating an offset of the object; and
  associated data having a plurality of entries, each entry corresponding to the stored object mapped to at least one memory element having a mapped address, the mapped address comprising a translation base and the block index.

33. The system of claim 32, wherein each entry in the associated data includes a field indicating a link to a management table entry.

34. The system of claim 32, wherein each entry in the associated data includes a field indicating a link to a next available entry in an address translation table.

35. The system of claim 32, wherein the associative memory element is a content addressable memory (CAM).

36. A method for eliminating memory fragmentation and garbage collection in a computer system, the method comprising:
  receiving a request to allocate a memory block for storing an object;
  allocating a block of addresses in a first address space for addressing an object;
  allocating the requested memory block in a second address space for storing the object, wherein the block of addresses is of a larger size than the memory block; and
  storing an association between the block of addresses and the memory block.

37. A method for eliminating memory fragmentation and garbage collection in a computer system, the method comprising:
  receiving a request to allocate a memory block for storing an object;
  allocating a block of addresses in a first address space for addressing an object;
  allocating the requested memory block in a second address space for storing the object, wherein the block of addresses is of a larger size than the memory block; and
  storing an association between the block of addresses and the memory block, wherein the memory block comprises a plurality of non-contiguous memory elements.

* * * * *